(12) United States Patent
Chan et al.

(10) Patent No.: US 9,565,300 B2
(45) Date of Patent: *Feb. 7, 2017

(54) PRIORITIZING MULTIPLE CALLERS WITH A SUGGESTED TIME FOR A CALLER TO CALL BACK

(71) Applicant: Elwha LLC, Bellevue, WA (US)

(72) Inventors: Alistair K. Chan, Bainbridge Island, WA (US); William David Duncan, Mill Creek, WA (US); Roderick A. Hyde, Redmond, WA (US); Ozgur Emek Yildirim, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/091,885

(22) Filed: Apr. 6, 2016

(65) Prior Publication Data

US 2016/0227028 A1   Aug. 4, 2016

Related U.S. Application Data

(63) Continuation of application No. 14/569,221, filed on Dec. 12, 2014, now Pat. No. 9,319,521.

(51) Int. Cl.
```
H04M 1/64      (2006.01)
H04M 3/42      (2006.01)
H04M 3/432     (2006.01)
H04W 4/14      (2009.01)
H04M 3/533     (2006.01)
```

(52) U.S. Cl.
CPC ........... *H04M 3/42195* (2013.01); *H04M 1/64* (2013.01); *H04M 3/42059* (2013.01); *H04M 3/432* (2013.01); *H04M 3/5335* (2013.01); *H04M 3/53325* (2013.01); *H04W 4/14* (2013.01)

(58) Field of Classification Search
CPC ..................... H04M 3/42195; H04M 3/42095; H04M 1/64
USPC ........................................... 379/7; 455/414.1
See application file for complete search history.

(56) References Cited

U.S. PATENT DOCUMENTS

| | | | | |
|---|---|---|---|---|
| 5,592,531 | A * | 1/1997 | Cheng | H04W 88/185 340/7.31 |
| 6,226,512 | B1 * | 5/2001 | Macaulay | H04M 1/575 455/413 |
| 7,362,854 | B2 | 4/2008 | McKnight | |
| 7,398,061 | B2 | 7/2008 | Mousseau | |
| 8,081,748 | B2 | 12/2011 | Johns | |
| 9,338,289 | B1 * | 5/2016 | Goyal | H04M 3/42059 |
| 9,351,133 | B2 * | 5/2016 | Offen | H04M 3/42059 |

(Continued)

*Primary Examiner* — Qutbuddin Ghulamali
(74) *Attorney, Agent, or Firm* — Foley & Lardner LLP

(57) ABSTRACT

A computing device includes a memory; and a processing circuit coupled to the memory and configured to receive call data regarding a plurality of telephone calls placed to the computing device, each of the plurality of telephone calls being placed by a caller; prioritize each caller based on the call data and prioritization data stored in the memory, the prioritization data providing an indication of a relationship between each caller and a receiver associated with the computing device and including at least one of electronic contact data, electronic calendar data, and social media data; determine a future time for each caller to speak with the receiver based on the prioritization of each caller; and transmit a message to each caller providing an indication of the future time.

35 Claims, 4 Drawing Sheets

(56) References Cited

U.S. PATENT DOCUMENTS

| | | |
|---|---|---|
| 2003/0036405 A1 | 2/2003 | Hijii |
| 2003/0063732 A1 | 4/2003 | McKnight |
| 2003/0112948 A1* | 6/2003 | Brown .............. H04M 3/42008 379/207.04 |
| 2005/0191969 A1 | 9/2005 | Mousseau |
| 2009/0003580 A1 | 1/2009 | Sharpe et al. |
| 2010/0158220 A1* | 6/2010 | Silverman ......... H04M 3/42195 379/88.22 |
| 2011/0151838 A1 | 6/2011 | Olincy et al. |
| 2011/0151842 A1 | 6/2011 | Olincy et al. |
| 2011/0151852 A1 | 6/2011 | Olincy et al. |
| 2011/0176670 A1* | 7/2011 | Kaplan ............. H04M 1/72566 379/210.01 |
| 2011/0298618 A1 | 12/2011 | Stahl et al. |

* cited by examiner

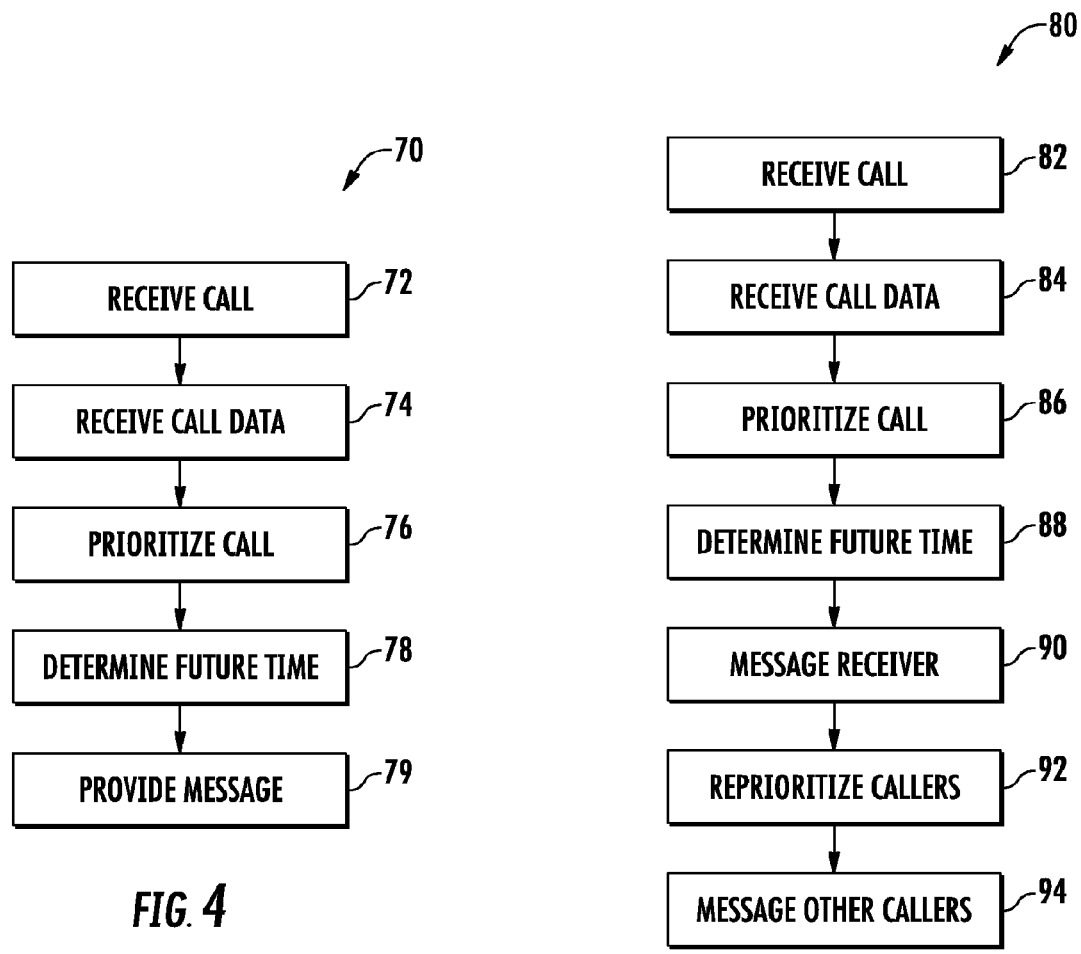

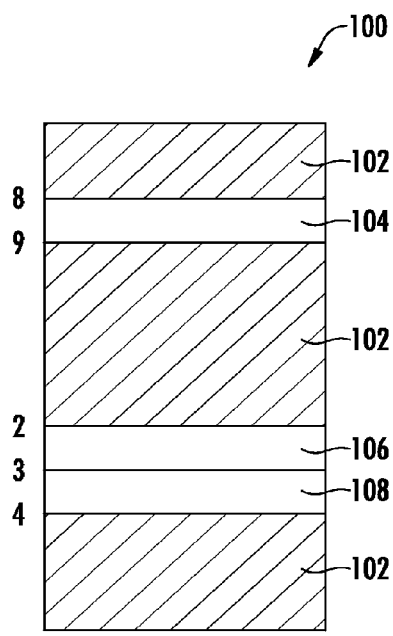
FIG. 6
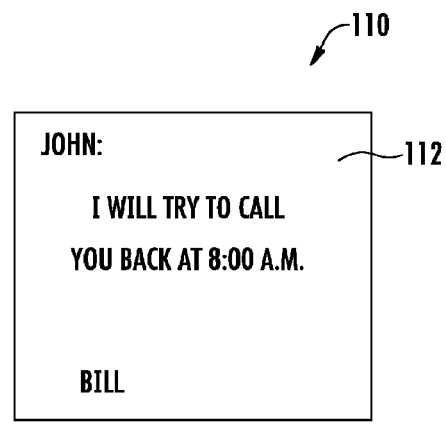
FIG. 7
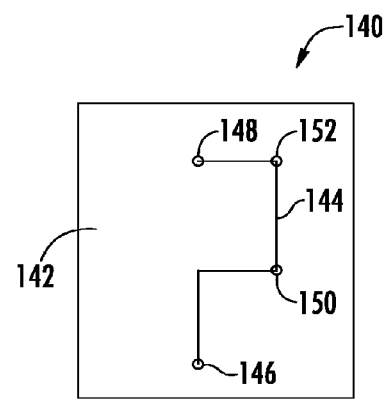
FIG. 8
FIG. 9

PRIORITIZING MULTIPLE CALLERS WITH A SUGGESTED TIME FOR A CALLER TO CALL BACK

CROSS-REFERENCE TO RELATED PATENT APPLICATIONS

This application is a continuation of U.S. application Ser. No. 14/569,221, filed Dec. 12, 2014, incorporated herein by reference in its entirety.

BACKGROUND

Telephone-enabled devices such as mobile phones are typically configured to direct missed calls to a voice messaging or similar system such that a caller is able to leave a voice message for the intended recipient. If the intended recipient is in a meeting, driving a car, or otherwise unable or unwilling to answer his or her phone, multiple telephone calls may go unanswered. Once the intended recipient is able or willing to again utilize his or her phone, he or she may, as desired, return one or more of the missed telephone calls.

SUMMARY

One embodiment relates to a computing device, including a memory; and a processing circuit coupled to the memory and configured to receive call data regarding a plurality of telephone calls placed to the computing device, each of the plurality of telephone calls being placed by a caller; prioritize each caller based on the call data and prioritization data stored in the memory, the prioritization data providing an indication of a relationship between each caller and a receiver associated with the computing device and including at least one of electronic contact data, electronic calendar data, and social media data; determine a future time for each caller to speak with the receiver based on the prioritization of each caller; and transmit a message to each caller providing an indication of the future time.

Another embodiment relates to a mobile computing device, including a processing circuit configured to receive call data regarding a plurality of telephone calls placed to the computing device, each of the plurality of telephone calls being placed by a caller; prioritize each caller based on the call data and prioritization data, the prioritization data providing an indication of a relationship between each caller and a receiver associated with the mobile computing device; determine a future time for at least one of the callers to speak with the receiver based on the prioritization of each caller and a predicted arrival time of the mobile computing device at a destination location; and transmit a message to at least one of the callers providing an indication of the future time.

Another embodiment relates to a method of prioritizing multiple callers, including receiving call data regarding a plurality of telephone calls placed to a computing device, each of the plurality of telephone calls being placed by a caller; prioritizing each caller based on the call data and prioritization data, the prioritization data providing an indication of a relationship between each caller and a receiver associated with the computing device and including at least one of electronic contact data, electronic calendar data, and social media data; determining a future time for each caller to speak with the receiver based on the prioritization of each caller; and transmitting a message to each caller providing an indication of the future time.

Another embodiment relates to a method of prioritizing a plurality of callers, including receiving call data regarding a plurality of telephone calls placed to a mobile computing device, each of the plurality of telephone calls being placed by a caller; prioritizing each caller based on the call data and prioritization data, the prioritization data providing an indication of a relationship between each caller and a receiver associated with the mobile computing device; determining a future time for at least one of the callers to speak with the receiver based on the prioritization of each caller and a predicted arrival time of the mobile computing device at a destination location; and transmitting a message to at least one of the callers providing an indication of the future time.

Another embodiment relates to a non-transitory computer-readable medium having instructions stored thereon that when executed by a computer processor cause the computer processor to perform a method, the method including receiving call data regarding a plurality of telephone calls placed to a computing device, each of the plurality of telephone calls being placed by a caller; prioritizing each caller based on the call data and prioritization data, the prioritization data providing an indication of a relationship between each caller and a receiver associated with a mobile computing device; determining a future time for at least one of the callers to speak with the receiver based on the prioritization of each caller and a predicted arrival time of the mobile computing device at a destination point; and transmitting a message to at least one of the callers providing an indication of the future time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 is a block diagram of a method for prioritizing missed telephone callers according to one embodiment.

FIG. 5 is a block diagram of a method of prioritizing missed telephone callers according to another embodiment.

FIG. 6 is a display of a calendar or scheduling user interface according to one embodiment.

FIG. 7 is a display of a messaging user interface according to one embodiment.

FIG. 8 is a display of a missed calls user interface according to one embodiment.

FIG. 9 is a display of a navigation system user interface according to one embodiment.

DETAILED DESCRIPTION

Figure 1:
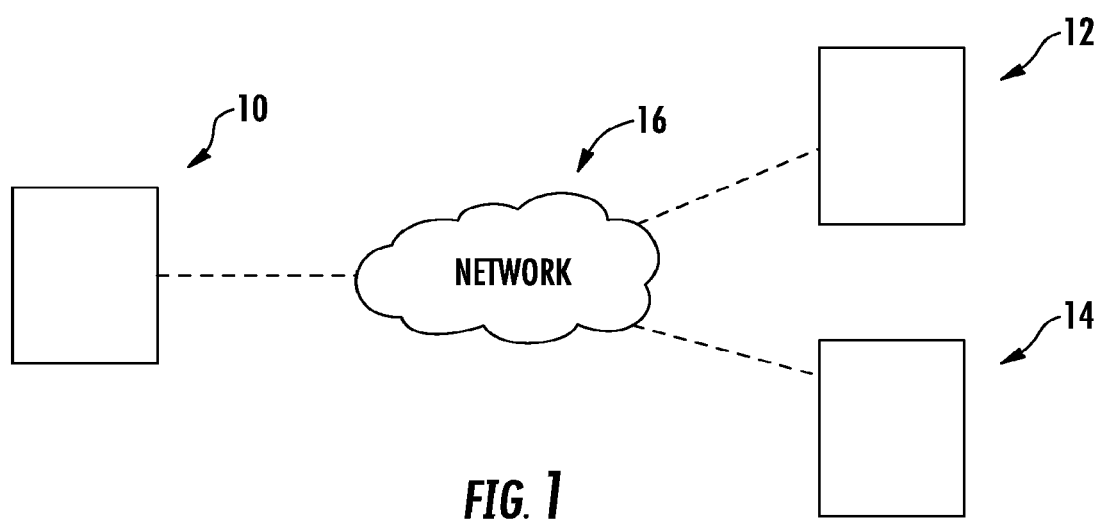
FIG. 1 is a schematic illustration of a plurality of telephone-enabled computing devices communicatively coupled by way of a communications network according to one embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various embodiments disclosed herein relate to systems and methods for prioritizing missed telephone callers. At times, a user (e.g., receiver, intended recipient, etc.) of a telephone-enabled device (e.g., a cellular phone, mobile phone, smart phone, landline phone, etc.) may be unable or unwilling to answer one or more incoming telephone calls from various callers. Eventually, the receiver may wish to return one or more of the missed telephone calls. As such, various embodiments disclosed herein relate to prioritizing callers associated with missed telephone calls and providing an indication of a future time that may be more convenient for the parties to speak. The prioritization may be performed based on various types of data, including data indicating the type or extent of the relationship between the caller and receiver. Such data may be provided by, for example, an electronic contacts application, an electronic calendar application, one or more messaging applications (e.g., phone, email, text messaging, etc.), and the like. Based on the prioritization, the future time may be communicated to the caller via one or more messages (e.g., during the telephone call, via a return telephone call, email, text message, etc.). The future time may be determined based on various types of data, including calendar data for the caller and/or receiver, navigation data regarding current travel of the caller and/or receiver, and the like.

Referring now to FIG. 1, computing device 10 is shown communicatively coupled to remote devices 12, 14 by way of communications network 16 according to one embodiment. Devices 10, 12, 14 may include a wide variety of devices, including mobile computing devices (e.g., mobile phones, cellular phones, laptop or tablet computers, etc.), desktop computing devices, (e.g., linked to landline phones, using VoIP, etc.), phone-enabled computing devices integrated into other components or systems (e.g., vehicle-based computing systems with telephone functionality, etc.), and the like. Network 16 may include any suitable wired or wireless communications network configured to enable cellular and/or data communications between devices (e.g., a cellular network, a local area network, a Bluetooth or infrared communication link, the Internet, etc.).

Figure 2:
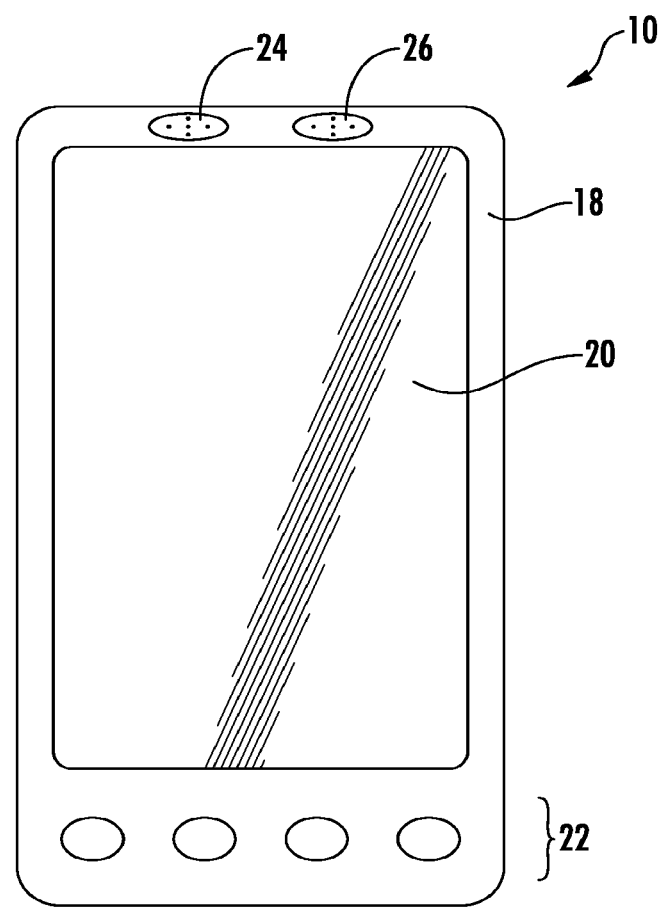
FIG. 2 is a front view of a computing device according to one embodiment.

Referring to FIG. 2, device 10 is shown in greater detail according to one embodiment. Device 10 includes housing 18, display 20, and one or more buttons 22 (e.g., soft-buttons, bezel buttons, a keyboard, etc.). Device 10 further includes speaker 24 and microphone 26 to enable telephone functionality for device 10. In some embodiments, device 10 is a mobile computing device, such as a laptop computer, cellular or mobile phone, and the like. In other embodiments, device 10 is communicatively coupled to a phone-enabled device and configured to receive data regarding telephone calls placed or received by the phone-enabled device. Device 10 may take any suitable size or shape and provide various functionality to users.

Figure 3:
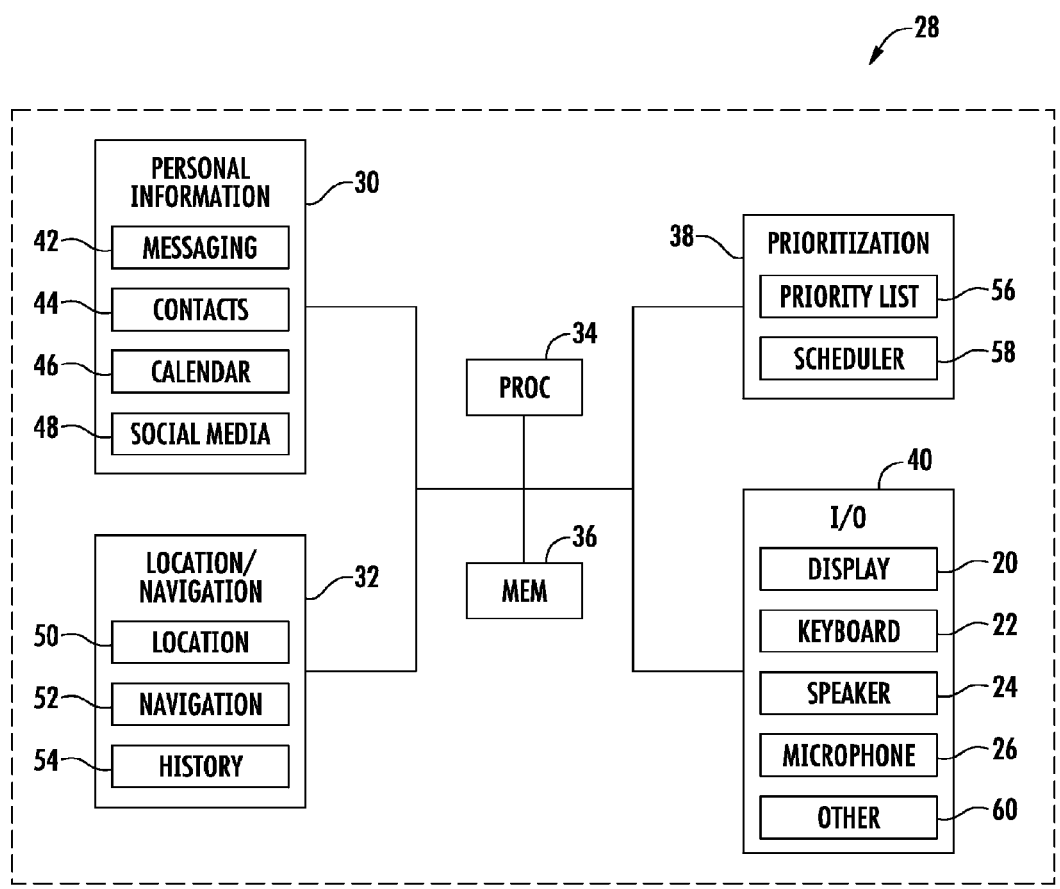
FIG. 3 is a block diagram of a processing circuit of the computing device of FIG. 2 according to one embodiment.

Referring now to FIG. 3, in one embodiment device 10 include a processing circuit shown as processing circuit 28. Processing circuit 28 includes personal information module 30, location/navigation module 32, processor 34, memory 36, prioritization module 38, and input/output devices 40. It should be noted that the various components illustrated in FIG. 3 may be integrated together or separated into further sub-components relative to those illustrated herein. Further, device 10 and processing circuit 28 may in some embodiments include further components in addition to those shown in FIGS. 2-3.

Personal information module 30 includes or stores various data regarding a user of device 10, including messaging data for one or more messaging applications 42, contacts data for electronic contact application 44, calendar data for electronic calendar application 46, and social media data for one or more social media applications 48. The various applications may run on or be accessible by device 10. Contact data includes various information regarding one or more contacts, including a name, address, telephone number, email address, and other contact information. Contact data may include a target response time for connecting with the caller (e.g., "I want to respond to Jim within 3 hours, but Sally is less important, and a 3 day response is acceptable"). The contact data may include a targeted call duration to be allotted to a return call with the caller (e.g., "when scheduling call backs, allot 15 minutes for calls with George, but Sam's call can be only 2 minutes long"). Further, one or more contacts may be tagged as high priority contacts such that they are ordered higher than non-priority callers on a list of callers; such priority status can be assigned to a contact either on a permanent basis, or a temporary and changeable basis. Calendar data includes data regarding various appointments, scheduling parameters, and the like, including indications of when the user is available, unavailable, and where the user is scheduled to be at various times. Calendar data may also include data regarding or links to contact data (e.g., in cases where an appointment is scheduled with a person in an electronic contact application, the contact application may be accessed by way of a link provided in an electronic calendar appointment). Social media data includes various information regarding a user's affiliation with one or more social media sites, and may further provide indications of other users that are associated with the user of device 10 via one or more social media sites.

The various types of data stored in personal information module 30 may also provide indications of a relationship between the user of device 10 and various other users, e.g., potential callers. For example, stored data may include messaging history regarding how often two users (e.g., an owner of device 10 and another user) telephone each other, text message each other, email each other, and the like (including the number of times, how recently, whether calls were missed or completed, whether missed calls were returned and with what priority, etc.). Similarly, the stored data may provide an indication of things two users may have in common in terms of contact data, such as a common workplace, a common home community, a common address or name (e.g., in the case of family members), and so on. Further, future and historical data for appointments between users may be stored, including dates, locations, frequency of meetings, and so on. In some embodiments, data regarding social media may provide indications of common social media websites for which two users are registered, visit while web browsing, etc.

Location/navigation module 32 in one embodiment includes location determining system 50, navigation system 52, and location history database 54. Location determining system 50 is configured to determine a current location of device 10. In one embodiment, location determining system 50 includes a GPS receiver and utilizes GPS techniques to determine a current location of device 10. In other embodiments, location determining system 50 may utilize other techniques, including network-based techniques (e.g., triangulation, etc.) and the like. Navigation system 52 is in one embodiment a navigation system configured to provide various navigation data to users (e.g., maps on a display, audible commands or alerts, etc.) regarding a planned route from a starting point to a destination point. Location history database 54 is configured to store data regarding the location and/or travel of device 10 at various points in time.

Referring further to FIG. 3, processing circuit 28 further includes processor 34 and memory 36. Processor 34 may be implemented as a general-purpose processor, an application specific integrated circuit (ASIC), one or more field programmable gate arrays (FPGAs), a digital-signal-processor (DSP), a group of processing components, or other suitable electronic processing components. Memory 36 is one or more devices (e.g., RAM, ROM, Flash Memory, hard disk storage, etc.) for storing data and/or computer code for facilitating the various processes described herein. Memory 36 may be or include non-transient volatile memory or non-volatile memory. Memory 36 may include database components, object code components, script components, or any other type of information structure for supporting the various activities and information structures described herein. Memory 36 may be communicably connected to processor 34 and provide computer code or instructions to processor 34 for executing the processes described herein.

Prioritization module 38 is in one embodiment configured to store data regarding prioritizing telephone calls placed to device 10 by various callers. In one embodiment, prioritization module 38 includes priority list 56 (e.g., a database, etc.). List 56 provides a priority list of potential callers that may place telephone calls to device 10. List 56 prioritizes, or ranks, the potential callers in an order corresponding to a desired priority in which the user of device 10 would typically desire to return the calls. For example, a user may prioritize a spouse higher than a coworker, a family member higher than a friend, and so on. As discussed in greater detail below, the data from priority list 56 is usable to prioritize multiple callers in cases where a user of device 10 is unable or unwilling to receive a number of telephone calls (e.g., as a result of being in a meeting, travelling, away from device 10, etc.). In some embodiments, priority list 56 may be implemented by tagging contacts in an electronic contacts application (e.g., "favorites") such that callers that are tagged contacts are given higher priority call back times. Such priority tags or priority ranking can be permanent (e.g., wife is always ranked highly), or can be temporary and changeable. In some embodiments, a caller whose call is missed, but is prioritized highly for a return call by prioritization module 38, may additionally be given a high priority tag; so that, for instance, if the prioritized caller places a new call before the first one is returned, prioritization module 38 ranks responding to him or her more highly. Such temporary priority tags can then be revoked after a subsequent call is completed.

Prioritization module 38 in some embodiments further includes scheduler 58. Scheduler 58 may operate in combination with calendar 46. In one embodiment, schedule 58 provide indications of time periods during which a user will be unable or unwilling to answer telephone calls (e.g., in addition to any time periods where calendar appointments may prevent the user from answering telephone calls), such that processing circuit 28 prioritizes any calls received during such time periods. In other embodiments, scheduler 58 provides an indication of time periods during which a user wishes to return any missed calls. For example, a user may specify that he or she does not want to answer any phone calls from 10:00 am until 12:00 noon, and that any calls received during that time should be prioritized by processing circuit 28 such that the receiver can return the calls between 1:00 pm and 2:00 pm. As shown in FIG. 6, in some embodiments, a display 100 is generated by device 10 to show periods 102 where a user is unable/unwilling to receive calls, and periods 104, 106, 108 where a user is able to receive/return calls. According to various alternative embodiments, other types of data may be stored by prioritization module 38. In some embodiments, a user of device 10 may also own, or anticipate receiving calls on, one or more other telephone-enabled devices. Accordingly, call data and/or prioritization data may be shared between a plurality of the user's telephone-enabled devices. Device 10 can be configured to receive such data from, or provide such data to, another telephone-enabled device associated with the user. In some embodiments, such data transfer can be made to or from an external database (e.g., a cloud server) which is itself not a telephone-enabled device.

Input/output devices 40 enable device 10 to receive inputs from and provide outputs to users of device 10. Devices 40 in one embodiment include display 20 (e.g., a touchscreen display, etc.), buttons 22 (e.g., one or more soft or hard buttons, etc.), speaker 24, microphone 26, and other devices 60. Processing circuit 28 is in one embodiment configured to receive inputs from any or all of these components, and may further include voice recognition capabilities, text to speech functionality, and the like.

Referring further to FIGS. 1-3, in some embodiments, processing circuit 28 is configured to prioritize multiple callers (e.g., callers having placed telephone calls to device 10 or a telephone device coupled to device 10). For each call, processing circuit 28 receives or accesses call data for the telephone call. Call data includes data related to a telephone call, including a caller name, caller telephone number, caller telephone type (e.g., cell phone or landline), a call time, a call date, related previous calls, and the like. Call data may further include data regarding a tone of voice of a caller (e.g., indicating the urgency of the call) or the content of a message left by the caller. Call data may be stored in memory 36 or in another suitable location.

In some embodiments, processing circuit 28 is further configured to receive or access prioritization data. Prioritization data includes data usable to establish a priority for each of a number of callers. The prioritization data may include any or all of data from prioritization module 38 (e.g., priority list 56) or personal information module 30 (e.g., messaging application 42, contacts application 44, calendar application 46, social media application 48, and similar data). In one embodiment, the prioritization data is used to establish an extent to which each caller and the receiver have a preexisting relationship. For example, priority list 56 may provide an indication that the receiver considers certain callers higher priority and considers other callers lower priority. As discussed in greater detail above, various types of data from personal information module 30 may provide indications of how often a caller and the receiver speak on the phone, correspond via email or text messaging, meet in person, interact with common social media platforms, and the like.

Referring to FIG. 8, in one embodiment, processing circuit 28 is configured to provide a display of prioritized missed calls. For example, processing circuit 28 in one embodiment provides missed calls display 120 via a suitable display of computing device 10. Display 120 includes a listing of various missed calls 122. For each missed call 122, display 120 includes priority 124, caller name 126, a time/date of the missed call 128, and call-back information 130. Other information can also be provided, including a caller telephone number, etc. As such, once a receiver of computing device 10 is available, processing circuit 28 can provide display 120 along with the information therein. In one embodiment, processing circuit 28 provides display 120 based on availability information for a user stored in an electronic calendar or scheduling application (e.g., such that display 120 is provided during free time of the user). In other embodiments, processing circuit 28 provides display 120 at predetermined times (e.g., user-defined times). In yet further embodiments, one or more fields of display 120 (e.g., priority number, caller name, etc.) are selectable links such that by selecting the link (e.g., tapping on an area of a touch screen display), a return call is placed to the respective caller.

Referring to FIG. 4, method 70 of prioritizing callers is shown according to one embodiment. A telephone call is received (72) but missed by the receiver. The missed telephone call may be an unanswered call, or a call answered by an automated messaging service. Call data for the telephone call is received (74). The call data may include one or more of a caller name, a caller number, a call time, a call date, and the like. Call data is in some embodiments accessed from an electronic contact application based on known call information (e.g., accessing an address using a known caller telephone number). The caller is prioritized with respect to any other missed calls/callers (76). In one embodiment, the caller is prioritized based on the call data and/or prioritization data. Prioritization data includes various types of data that provides an indication of the relationship between the caller and the receiver. For example, the caller and receiver may frequently communicate via phone, text, or email, they may have periodic appointments with each other that are reflected on an electronic calendar, they may share a common last name, employer, etc., and the like.

Based on the prioritization of the caller, a future time is determined for the receiver to respond to the call of the caller (78), i.e., for the receiver to return the call or for the caller to call again. In some embodiments, the future time is determined based on accessing an electronic calendar of one or both of the caller and the receiver. In other embodiments, a receiver can establish predetermined call-back times during which the receiver plans to return telephone calls. In yet further embodiments, the future time may be determined based on an expected arrival time at a destination (e.g., in cases where the receiver is driving in a car, etc.). The destination may be determined and the future time automatically suggested to the driver. In the case of urgent calls, the future time may be determined based on an expected arrival time at an intermediate location (e.g., a rest stop, a next exit, etc.). The intermediate location may be determined based on a current location and/or direction of travel of the user, or alternatively, may be located on a planned travel route to a destination location. The future time may be determined taking into account driving conditions such as traffic, weather, road blockages, and the like. In such cases, as shown in FIG. 9, navigation application 52 may provide a navigation display 140 including map 142. Map 142 includes starting location 146, destination location 148, and one or more intermediate locations 150, 152 along route 144. Based on determining, for example, a present location and speed of a vehicle along route 144, an expected arrival time may be determined for the intermediate locations and the destination location. In turn, based on the priority of the caller, a future time may be selected appropriately at an intermediate location or the destination location. In some embodiments, the future time is selected automatically (e.g., by processing circuit 28), while in other embodiments, processing circuit 28 may generate a request for the user to select one of the locations.

Once the future time is determined, a message is communicated to the caller indicating the future time when the receiver expects to return the call of the caller (79) (alternatively, the message may request that the caller call back at the future time). The message may take a variety of forms, including an automated voice message provided to the caller during the telephone call placed by the caller, an automated return message (e.g., a telephone call, email, text message, etc.), indicating the future time, and so on. Referring to FIG. 7, one embodiment of a message display 110 showing a message 112 is illustrated. As shown in FIG. 7, message 112 is provided from the receiver to the caller and provides an indication of a future time at which the receiver will return the telephone call of the caller.

Referring now to FIG. 5, method 80 of prioritizing callers is shown according to one embodiment. Method 80 is in many respects similar to method 70 shown in FIG. 4. A telephone call is received (82). The telephone call may be a missed call, or a call answered by an automated messaging service. Call data for the telephone call is received (84). The call data may include one or more of a caller name, a caller number, a call time, a call date, and the like. Call data is in some embodiments accessed from an electronic contact application based on known call information (e.g., a caller telephone number). The caller is prioritized with respect to any other missed calls/callers (86). In one embodiment, the caller is prioritized based on the call data and/or prioritization data. Prioritization data includes various types of data that provides an indication of the relationship between the caller and the receiver. For example, the caller and receiver may frequently communicate via phone, text, or email, they may have periodic appointments with each other that are reflected on an electronic calendar, they may share a common last name, employer, etc., and the like.

Based on the prioritization of the caller, a future time is determined for the receiver to return the call of the caller (88). In some embodiments, the future time is determined based on accessing an electronic calendar of one or both of the caller and the receiver. In other embodiments, a receiver can establish predetermined call-back times during which the receiver plans to return telephone calls. In yet further embodiments, the future time may be determined based on an expected arrival time at a destination (e.g., in cases where the receiver is driving in a car, etc.). Alternatively, in the case of urgent calls, the future time may be determined based on an expected arrival time at an intermediate location (e.g., a rest stop etc.) located on a planned travel route to a destination location. Once the future time is determined, a message is communicated to the receiver indicating the future time when the receiver expects to return the call of the caller (90) (alternatively, the message may request that the caller call back at the future time).

After prioritizing the caller, previous callers are reprioritized based on the prioritization of the present caller (90). For example, if the current caller is considered a high priority caller, the current caller may be prioritized above earlier callers. As such, the prioritization, and therefore the future time of an expected return call, of the previous callers may change based on additional received calls. In cases where the prioritization of a previous caller changes the future time of when the receiver expects to return the telephone call, a message is communicated to the previous caller indicating a new future time for a return telephone call (94).

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of prioritizing multiple callers, comprising:
   receiving call data regarding a plurality of telephone calls placed to a computing device, each of the plurality of telephone calls being a missed telephone call placed by a caller;
   prioritizing each caller based on the call data and prioritization data, the prioritization data providing an indication of a relationship between each caller and a receiver associated with the computing device and including at least one of electronic contact data, electronic calendar data, and social media data;
   determining a future time for each caller to speak with the receiver based on the prioritization of each caller; and
   transmitting a message to each caller providing an indication of the future time.

2. The method of claim 1, wherein the call data includes at least one of a caller name, a caller telephone number, a type of telephone caller, a call time, and a call date.

3. The method of claim 1, wherein the prioritization data includes a priority list of caller names.

4. The method of claim 3, further comprising placing the caller's name on the priority list of caller names based on the prioritization of the caller.

5. The method of claim 1, wherein the relationship includes at least one of a familial relationship, a marital relationship, and a business relationship.

6. The method of claim 1, wherein the electronic contact data includes at least one of a name and an address from an electronic contact list.

7. The method of claim 1, wherein the electronic contact data includes a target response time associated with returning calls by the caller.

8. The method of claim 1, wherein the electronic contact data includes a targeted call duration to be allotted for a returned call to the caller.

9. The method of claim 1, wherein the electronic contact data includes a tag identifying at least one caller as a high priority contact, wherein the callers are prioritized based on the tag.

10. The method of claim 1, wherein the electronic calendar data includes an appointment from an electronic calendar.

11. The method of claim 1, wherein the social media data includes data linking each caller and the receiver on a social media website.

12. The method of claim 1, wherein the prioritization data includes data related to one or more physical visits between each caller and the receiver.

13. The method of claim 1, wherein the prioritization data includes data regarding a current distance between each caller and the computing device.

14. The method of claim 1, further comprising determining the future time based on scheduling data.

15. The method of claim 14, wherein the scheduling data provides an indication of free time on an electronic calendar of the caller.

16. The method of claim 14, wherein the scheduling data includes a predicted time of arrival at intermediate location between a current location of the computing device and a destination location during movement of the computing device.

17. The method of claim 1, further comprising transmitting messages to previous callers based on reprioritizing the previous callers.

18. A method of prioritizing a plurality of callers, comprising:
    receiving call data regarding a plurality of telephone calls placed to a mobile computing device, each of the plurality of telephone calls being a missed telephone call placed by a caller;
    prioritizing each caller based on the call data and prioritization data, the prioritization data providing an indication of a relationship between each caller and a receiver associated with the mobile computing device;
    determining a future time for at least one of the callers to speak with the receiver based on the prioritization of each caller and a predicted arrival time of the mobile computing device at a destination location; and
    transmitting a message to at least one of the callers providing an indication of the future time.

19. The method of claim 18, wherein the future time is based on current traffic conditions.

20. The method of claim 18, wherein the call data provides an indication of at least one of a tone of a voice of a caller and a content of a message of a caller.

21. The method of claim 18, wherein the call data provides an indication of whether a current missed call is placed by a same caller as a previous missed call.

22. The method of claim 18, further comprising determining the future time based on scheduling data.

23. The method of claim 22, wherein the scheduling data provides an indication of free time on an electronic calendar of the receiver.

24. The method of claim 22, wherein the scheduling data provides an indication of free time on an electronic calendar of the caller.

25. The method of claim 22, wherein the scheduling data includes a predetermined time period for the receiver to return missed telephone calls.

26. The method of claim 18, wherein the message includes an electronic calendar invitation configured to enable each caller to populate an electronic calendar application of a computing device of the caller.

27. The method of claim 18, wherein the message indicates a time when the caller should place a future call to the computing device.

28. The method of claim 18, wherein the message indicates a time when the receiver will place a future call to the caller.

29. A method comprising:
receiving call data regarding a plurality of telephone calls placed to a MOBILE computing device, each of the plurality of telephone calls being a missed telephone call placed by a caller;
determining a future time for at least one of the callers to speak with the receiver based on the prioritization of each caller and a predicted arrival time of the mobile computing device at a destination point; and
transmitting a message to at least one of the callers providing an indication of the future time.

30. The method of claim 29, wherein the future time is determined based on current traffic conditions.

31. The method of claim 29, wherein the call data includes at least one of a caller name, a caller telephone number, a type of telephone caller, a call time, and a call date.

32. The method of claim 29, wherein the call data provides an indication of at least one of a tone of a voice of the caller and a content of a message of a caller.

33. The method of claim 29, wherein the call data provides an indication of whether a current missed call is placed by a same caller as a previous missed call.

34. The method of claim 29, wherein the method further comprises determining the future time based on scheduling data.

35. The method of claim 29, wherein the scheduling data provides an indication of free time on an electronic calendar of the receiver.

* * * * *